Patented Aug. 10, 1954

2,686,123

UNITED STATES PATENT OFFICE 2,686,123

STABILIZATION OF DEHYDRATED VEGETABLE MATERIAL

Tod W. Campbell, Orinda, and Galvin M. Coppinger, El Cerrito, Calif., assignors to the United States of America as represented by the Secretary of Agriculture No Drawing. Application July 19, 1951, Serial No. 237,655

24 Claims. (Cl. 99—8)

(Granted under Title 35, U. S. Code (1952), sec. 266)

The invention herein described may be manufactured and used by or for the Government of the United States of America for governmental purposes throughout the world without the payment to us of any royalty thereon.

This invention relates to and has among its objects the use of acyl pyrogallols as antioxidants in the stabilization of lipoidal materials such as fats and foodstuffs containing fats. Further objects of this invention will be obvious from the description herein.

The acyl-pyrogallols with which this invention is concerned can be represented by the formula

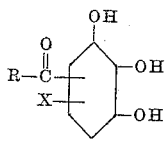

wherein:

is an acyl radical in which R is a hydrocarbon radical, as for example, acetyl, propionyl, butyryl, isobutyryl, valeryl, isovaleryl, caporyl, caprylyl, capryl, lauroyl, diethylacetyl, benzoyl, methylbenzoyl, phenylacetyl, and so forth;

X is hydrogen or an alkyl radical, as for example, methyl, ethyl, propyl, isopropyl, butyl, isobutyl, sec.-butyl, tert.-butyl, amyl, hexyl, octyl, decyl, dodecyl, and so forth.

In synthesizing the acyl pyrogallols of this invention, we react pyrogallol or an alkyl pyrogallol with the appropriate carboxylic acid in the presence of a Friedel-Crafts catalyst. This technique differs from those previously used in that it is a one-step reaction, it gives high yields, and it is economical. Thus, previous methods for acylating pyrogallol involve the reaction of pyrogallol with a carboxylic acid chloride, acetyl chloride, for example, whereby to produce by esterification of one of the hydroxy groups, pyrogallol acetate. This compound is then isolated and heated with a Friedel-Crafts catalyst whereby a rearrangement takes place to form the acetyl pyrogallol. This procedure gives yields on the order of 40–50% whereas our process gives yields as high as 90%. The prior process requires the use of an acyl halide whereas we use the acid itself. This is an advantage because the acids are generally cheaper and more easily available than the acyl halides. Finally, it is to be noted that the prior procedure involves two distinct steps—esterification and rearrangement whereas our process is carried out in a single stage and is thus more convenient and expeditious. Carrying out our process involves first the selection of the appropriate carboxylic acid. It is obvious that the acid which contains the desired acyl radical should be selected. Thus to prepare the acetyl derivative, the proper acid is acetic, for the propionyl derivative, the proper acid is propionic, and so forth. The other organic reactant may be pyrogallol itself or an alkyl pyrogallol. Thus to prepare the compounds of the above formula wherein X is hydrogen, the proper reactant is pyrogallol. If one desires to prepare the products wherein X is alkyl, then the proper reactant is an alkyl pyrogallol, that is pyrogallol containing an alkyl substituent attached to the aromatic nucleus. In any event the carboxylic acid and the pyrogallol (or alkyl pyrogallol) are used in about equimolar proportions. The Friedel-Crafts catalysts may be any of those commonly used in this type of synthesis as for example aluminum chloride, zinc chloride, aluminum bromide, ferric chloride, hydrogen fluoride, magnesium chloride, and so forth. Usually we prefer boron trifluoride as it results in highest yields and since it is a gas is easily removed from the reaction mixture. The reaction is generally conducted at temperatures below room temperature for best yields although in general temperatures from about 0° C. to about 50° C. may be employed. The product is isolated by pouring the reaction mixture into an excess of water and extracting the product with an organic solvent such as ether, carbon disulphide, carbon tetrachloride, benzene, etc. If the extract is colored due to the presence of oxidation products it may be purified by extraction with an aqueous solution of a dilute alkaline agent such as sodium bicarbonate or carbonate. After evaporation of solvent, the product may be recrystallized from a suitable solvent such as water or an organic solvent if its side chains contain 4 or more carbon atoms which render it poorly soluble in water.

In preparing the compounds responding to the above formula wherein X is an alkyl radical, an alternative procedure may be used. To this end pyrogallol is reacted with the appropriate carboxylic acid as described above. This product is then alkylated by the usual Friedel-Crafts method to introduce an alkyl radical into the pyrogallol nucleus. A typical method of carrying out this alternative method is shown in Example IV herein.

The following examples demonstrate the invention in greater detail, these examples being submitted only by way of illustration but not limitation.

Example I

Pyrogallol (12.6 grams, 0.1 mole) was dissolved in 50 ml. of ether and 6 grams (0.1 mole) of acetic acid was added. The resulting solution was saturated with boron trifluoride gas at 0° C. The reaction mixture was permitted to stand for one hour then poured in 500 ml. of water. The orange mixture which resulted was extracted thoroughly with ether and the ethereal solution was extracted with dilute (5%) aqueous sodium bicarbonate which removed most of the color. The purified ethereal solution was then washed twice with water, dried, and evaporated. Final purification was brought about by recrystallization from water. The product, 4-acetyl pyrogallol, was obtained in 90% yield, and had a melting point of 171° C.

Example II

The process of Example I was repeated, substituting for the acetic acid the stoichiometrically equivalent amount of propionic acid, butyric acid, valeric acid, isovaleric acid, diethylacetic acid (also known as alpha-ethyl butyric acid), and benzoic acid. The products derived from propionic acid was recrystallized from water as in Example I. The other products were recrystallized from a benzene-hexane mixture. The results obtained are set forth in the following table:

| Product | Melting point, °C | Yield, Percent |
| --- | --- | --- |
| 4-Propionyl pyrogallol | 128 | 80 |
| 4-Butyryl pyrogallol [1] | 102 | 79 |
| 4-Valeryl pyrogallol | 82 | 88 |
| 4-Isovaleryl pyrogallol [2] | 109 | 72 |
| 4-(Diethylacetyl) pyrogallol [3] | 111 | 71 |
| 4-Benzoyl pyrogallol | 146 | 44 |

[1] Analytical data in percent. Calculated: C, 61.21; H, 6.17. Found: C, 61.5; H, 6.22.
[2] Analytical data in percent. Calculated: C, 62.8; H, 6.69. Found: C, 63.0; H, 6.78.
[3] Analytical data in percent. Calculated: C, 64.3; H, 7.18. Found: C, 64.4; H, 7.27.

Example III

The process of Example I was repeated, substituting for the pyrogallol a stoichiometrically equivalent amount of 6-ethyl pyrogallol. The product, 4-acetyl-6-ethyl pyrogallol was obtained in a yield of 78% and had a melting point of 141° C.

Example IV

Fifty grams of 4-acetyl-pyrogallol, 100 grams of tert.-butyl chloride, 500 ml. glacial acetic acid, and 8 grams of anhydrous ferric chloride were heated together for 72 hours on a steam bath. The reaction mixture was poured into water and the solid filtered off and recrystallized from 50% n-propanol-water. The product 4-acetyl-6-t.butyl-pyrogallol was obtained in a yield of 35 grams as crystalline pearly scales, melting point 174° C. Analytical data in per cent:
Calculated: C, 64.3; H, 7.19. Found: C, 64.3; H, 7.29.

Example V

A solution was prepared containing 0.06% carotene in mineral oil (liquid petrolatum). This solution was divided into a series of portions and a different acyl-pyrogallol was dissolved in each portion at a concentration of one mole of the acyl-pyrogallol for each two moles of carotene. The solutions were stored at 75° C. and measurements were made periodically to determine the amount of carotene remaining in each portion.

For comparative purposes, a control was run (no antioxidant added) and also to several other portions of the carotene solution were added various known antioxidants (nordihydroguaiaretic acid, tertiary-butylated hydroxy anisole, propyl gallate) in the same concentrations as with the acyl pyrogallols. These samples were also stored at 75° C. and assayed periodically to determine carotene content.

The results of these experiments are summarized in the following table:

| Compound added | Time for disappearance of 20% of the carotene, hours |
| --- | --- |
| None (control) | less than 1. |
| 4-Acetyl pyrogallol | 160. |
| 4-Propionyl pyrogallol | 220. |
| 4-Butyryl pyrogallol | 204. |
| 4-Isovaleryl pyrogallol | 225. |
| 4-(Diethylacetyl) pyrogallol | 226. |
| 4-Acetyl-6-ethyl pyrogallol | 192. |
| 4-Acetyl-6-tert. butyl pyrogallol | 235. |
| 4-Isovaleryl-6-tert. butyl pyrogallol | 202. |
| Nordihydroguaiaretic acid | 208. |
| t-Butylated hydroxy anisole | 130. |
| Propyl gallate | 165. |

The acyl pyrogallols produced in accordance with this invention possess marked antioxidant properties and thus can be used to stabilize various substances which normally tend to undergo autoxidation or rancidification. Thus for example they may be incorporated with fats or oils so that these products may be stored for long periods of time without developing off-flavors or odors. In general, the acyl pyrogallols should be added in a concentration from about 0.001 to about 0.1%, the higher proportions in this range giving, of course, the greater protection from rancidification. In the same way the acyl pyrogallols may be incorporated in about the same proportion with mayonnaise, salad dressings, canned or frozen meat products, sausages, cheeses, and so forth. All of these types of food products contain fats to a greater or lesser extent hence are subject to development of off-flavors and odors by reason of rancidification of the fat content. Many other feed and food products contain lipoidal materials and are normally subject to oxidative changes on storage. A prime example in this category is alfalfa which is valued chiefly because of its carotene content. However, the usual dried alfalfa meal of commerce rapidly loses its carotene content. For example, if the meal is stored at 80° F., it will lose about two-thirds of its carotene content in 24 weeks. Of course, at higher temperatures such as prevail in barns or warehouses in summer, the rate of carotene loss is greatly accelerated. By incorporating the acyl pyrogallols with the alfalfa the rate of carotene loss will be greatly retarded. For application, the alfalfa meal may be tumbled about in a rotating drum while it is sprayed with a solution of the acyl pyrogallol dissolved in a suitable solvent such as ethanol, propanol, butanol, deodorized kerosene, 2-methoxy-ethanol, 2-ethoxy-ethanol, and so forth. Many other forage, cereal, legume, and oilseed products are prone to rancidification on storage. A notorious example which may be mentioned is rice bran which undergoes very rapid autoxidation. Thus our invention may be utilized by the incorporation of the acyl pyrogallols, by spraying of solutions thereof or other obvious applicative procedures, with such materials as dried grasses, rice bran, brown rice, wheat bran, wheat germ, soy beans, soybean meal, cottonseed, cotton seed meal, and so forth. If the product is intended to be used as a food, it is advisable to limit the concentration of acyl pyrogallol to about from 0.001 to about 0.1%. If the product is intended for feed or inedible purposes then the proportion of acyl pyrogallol may be increased to afford greater protection against oxidation and thus may be increased to say 0.5% or higher as may be necessary. Another point to be noted is that dehydrated vegetables contain small though significant amounts of fat and, particularly if their moisture content is very low, they will develop off-flavors and odors due to rancidification of their fat content. In the case of vegetables the fat particles are minute and distributed throughout the vegetable tissue and it is necessary that the antioxidant be dispersed throughout the vegetable tissue so that it will be in intimate contact with these fat particles. Such an end may be achieved in several alternative ways, as follows:

The first alternative technique is applicable at any stage prior to dehydration, the important point being that the vegetable material be treated while it is moist. In this technique, the acyl pyrogallol is dissolved in water and sprayed on the vegetable. If desired, the vegetable may be dipped into a solution of the acyl pyrogallol although, in general, spraying is preferred as it gives better control of antioxidant concentration. In the normal processing of dehydrated products, it is customary to blanch the vegetables and then subject them to sprays of water for cooling. In addition the blanched product may be sprayed with an aqueous solution of a sulphiting agent (sulphur dioxide, sodium sulphite, sodium bisulphite, etc.) in order to minimize browning. Either the washing or sulphiting sprays can be utilized for the introduction of the antioxidant by simply dissolving the antioxidant in the liquid used for the spray. Since the antioxidants are poorly soluble in water it is necessary to employ vigorous agitation and use an essentially saturated solution of the antioxidant. Actually, the concentration of antioxidant in the spray liquid is not critical, since the ultimate aim is to apply sufficient spray so that the vegetable contains from about 0.001 to about 0.1% of the antioxidant (on a dry basis).

In this type of procedure, thorough penetration and dispersion of the antioxidant occurs because the interstices of the tissue are filled with water, these interstices thus providing the channels through which the antioxidant solution can enter the tissue and penetrate into every portion thereof. It is further to be emphasized that at this stage of the processing the vegetable is moist and spraying with the antioxidant solution does not interfere with the orderly progress of the operations. Although we prefer to dissolve the antioxidant in the cooling water or sulphiting solution, it is evident that if desired, the vegetables may be subjected to a spray of water containing the antioxidant just for this purpose and not concerned with cooling, sulphiting, or other operation.

A second method of dispersing the acyl pyrogallol throughout the tissue of the vegetable involves production of the dehydrated product by the conventional methods. This dehydrated product is placed in a container which also contains a pad of paper, cloth, clay, bentonite, etc. impregnated with the acyl pyrogallol. The container is then sealed. Upon standing, the antioxidant vaporizes and diffuses into the vegetable tissue. In this case, the penetration of the tissue involves a vapor phase system. Since the product has been dehydrated, the interstices in the tissue are filled with air and these interstices provide the channels by which the antioxidant vapors can penetrate and be distributed throughout the tissue structure. In general, the pad should contain an amount of antioxidant equal to about 0.001 to about 0.1% of the weight of the dehydrated product in the container. Naturally, the higher proportion within this range will effect a greater protection against rancidity. A greater proportion of antioxidant than the stated range can be used but may impart a detectable flavor to the food product. The pad containing the antioxidant need not be in actual contact with the foodstuff since diffusion takes place in the vapor phase. Thus it may be convenient to fasten the pad on the lid of the container or enclose it in a foraminous receptacle attached to the lid. In such case when the container is opened for use there will be no danger that the pad will be consumed with the edible material.

A variant of this second technique involves mixing together the dehydrated vegetable with a dry mixture of an antioxidant and an edible powder, this latter acting merely as a diluent. The diluent may be, for example, sugar, starch, or a powdered dehydrated vegetable. For example, dehydrated diced potatoes may be agitated with a mixture of the antioxidant and powdered dehydrated potatoes. The product in any case is placed in a closed container whereupon vaporization and penetration of the antioxidant takes place as explained above. As in the case of the antioxidant pad, the amount of acyl pyrogallol applied in general should be from about 0.001 to about 0.1% of the weight of the dehydrated vegetable product.

In applying the acyl pyrogallols of this invention it is often advantageous to use them in conjunction with an antioxidant synergist, that is, a substance which gives an increased effect when added to the antioxidant. In this category may be mentioned citric acid, phosphoric acid, phospholipids such as cephalin and lecithin, ethylene diamine tetraacetic acid and its salts such as the tetra sodium salt, and so forth. In treating vegetables, the vegetable tissue while moist may be sprayed with an aqueous solution of citric acid or other antioxidant-synergist and then dehydrated. After dehydration the acyl pyrogallol may be applied to the product by either of the vapor transference methods previously mentioned. This technique has the advantage that the citric acid which is virtually non-volatile is applied by liquid phase treatment whereas the acyl pyrogallol which is volatile to a sufficient extent is applied by the vapor phase. The acyl pyrogallol of this invention may thus be applied to vegetables of every type as the leafy vegetables such as spinach, cabbage, kale, etc., the legumes such as beans and peas, the root crops such as turnips, rutabagas, beets, carrots, potatoes, sweet potatoes, onions, etc.

Having thus described our invention, we claim:

1. A process of stabilizing dehydrated vegetable materials which are normally subject to oxidative deterioration which comprises adding thereto an acyl pyrogallol the acyl radical being represented by the formula

wherein R is a hydrocarbon radical.

2. The process of claim 1 wherein the acyl pyrogallol is 4-propionyl pyrogallol.

3. The process of claim 1 wherein the acyl pyrogallol is 4-butyryl pyrogallol.

4. The process of claim 1 wherein the acyl pyrogallol is 4-isovaleryl pyrogallol.

5. The process of claim 1 wherein the acyl pyrogallol is 4-(diethylacetyl) pyrogallol.

6. The process of claim 1 wherein the acyl pyrogallol is 4-acetyl-6-tert. butyl pyrogallol.

7. A process of stabilizing a dehydrated vegetable material containing carotene which is normally subject to oxidative deterioration which comprises adding thereto an acyl pyrogallol the acyl radical being represented by the formula

wherein R is a hydrocarbon radical.

8. The process of claim 7 wherein the acyl pyrogallol is 4-propionyl pyrogallol.

9. The process of claim 7 wherein the acyl pyrogallol is 4-butyryl pyrogallol.

10. The process of claim 7 wherein the acyl pyrogallol is 4-isovaleryl pyrogallol.

11. The process of claim 7 wherein the acyl pyrogallol is 4-(diethylacetyl) pyrogallol.

12. The process of claim 7 wherein the acyl pyrogallol is 4-acetyl-6 tert. butyl pyrogallol.

13. A composition of matter stabilized against oxidative deterioration and containing a dehydrated vegetable material which is normally subject to oxidative deterioration and at least about 0.001% of an acyl pyrogallol the acyl radical being represented by the formula

wherein R is a hydrocarbon radical.

14. The composition of matter of claim 13 wherein the acyl pyrogallol is 4-propionyl pyrogallol.

15. The composition of matter of claim 13 wherein the acyl pyrogallol is 4-butyryl pyrogallol.

16. The composition of matter of claim 13 wherein the acyl pyrogallol is 4-isovaleryl pyrogallol.

17. The composition of matter of claim 13 wherein the acyl pyrogallol is 4-(diethylacetyl) pyrogallol.

18. The composition of matter of claim 13 wherein the acyl pyrogallol is 4-acetyl-6-tert. butyl pyrogallol.

19. A composition of matter stabilized against oxidative deterioration and containing a dehydrated vegetable material containing carotene which is normally subject to oxidative deterioration and at least about 0.001% of an acyl pyrogallol the acyl radical being represented by the formula

wherein R is a hydrocarbon radical.

20. The composition of matter of claim 18 wherein the acyl pyrogallol is 4-propionyl pyrogallol.

21. The composition of matter of claim 18 wherein the acyl pyrogallol is 4-butyryl pyrogallol.

22. The composition of matter of claim 18 wherein the acyl pyrogallol is 4-isovaleryl pyrogallol.

23. The composition of matter of claim 18 wherein the acyl pyrogallol is 4-(diethylacetyl) pyrogallol.

24. The composition of matter of claim 18 wherein the acyl pyrogallol is 4-acetyl-6-tert. butyl pyrogallol.

References Cited in the file of this patent

UNITED STATES PATENTS

| Number | Name | Date |
| --- | --- | --- |
| 443,402 | Nencki | Dec. 23, 1890 |
| 2,031,069 | Richardson et al. | Feb. 18, 1936 |
| 2,554,687 | Thompson | May 29, 1951 |
| 2,557,921 | Gleim | June 26, 1951 |
| 2,587,489 | Kosolapoff | Feb. 26, 1952 |

OTHER REFERENCES

Hackh, "Chemical Dictionary," 3rd Edition (1946), page 365, Blackeston, Publisher.

Bailey—Oil and Fat Products (1945), Interscience Pub. Inc., N. Y. C., pages 28 and 29.